Patented Feb. 23, 1954

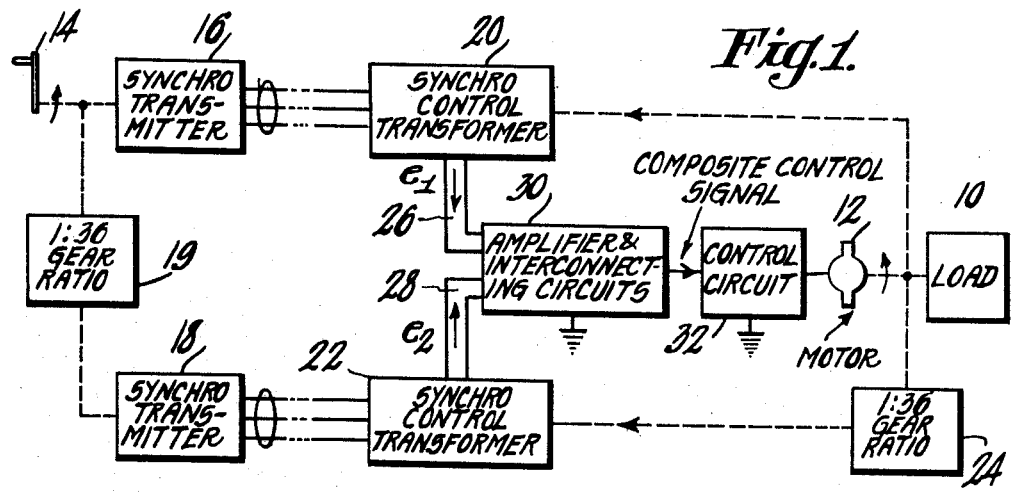

2,670,456

UNITED STATES PATENT OFFICE 2,670,456

SWITCHING SYSTEM FOR DUAL-SPEED ELECTRIC SERVO MECHANISM

Arthur F. Naylor, Haddonfield, and Arnold M. Spielberg, Camden, N. J., assignors to Radio Corporation of America, a corporation of Delaware Application June 30, 1950, Serial No. 171,442

11 Claims. (Cl. 318—30)

1

This invention relates to servo mechanisms and more particularly to the type of servo mechanisms in which control of the object to be positioned is transferred from one error signal to another. Such systems are sometimes called dual-speed servo mechanisms.

In order to obtain high precision electric transmission of data, a combined high and low speed servo mechanism system is often employed. For example, in such systems it may be desired to position a distant object to correspond to the rotational position of a control element. Two synchro transmitters may be controlled by the element, one being rotated at some multiple of the rotational speed of the other. Similar synchro control transformers are employed mechanically coupled to the load. From these transformers, two error signals are derived, one of which may be proportional to the sine of the angle by which the load or object is displaced from the position of correspondence, and the other of which may be proportional to the sine of an integral number ($n$) times the angle. Thus the second signal has a greater periodicity than the first, and specifically $n$ times the first. In the prior art, the low speed or directly proportional error signal is commonly used for control so long as the error is greater than about $$\frac{1}{4n}$$

of 360°.

The high speed output is used for control when the error is less than this because of its greater accuracy. The magnitude of the low speed error signal is often used for switching control between the two error signals. Such a dual-speed system, for example, is described and illustrated in connection with Fig. 3.5 at chapter 3 of volume 26 entitled "Theory of Servo Mechanisms" of the Radiation Laboratory Series, published by Massachusetts Institute of Technology.

One of the great disadvantages of such an arrangement is the discontinuity introduced by the switching action. Particularly if the load is one of appreciable inertia, or if a high speed, high power motor is employed, when the switch is actuated and control of the error signals is interchanged, the load is violently actuated. Operation at the time of switching is jerky and imposes great mechanical strains on the system. Such operation is, of course, undesired.

It is an object of the present invention to improve the operation of servo mechanism systems.

It is another object of the invention to im-

2 prove the operation of the so-called high precision positional transmission systems in which high and low speed error signals are employed.

Another object of the invention is to maintain continuous control of the positioning mechanism in such systems without objectionable discontinuities in the control signals.

These and other objects, advantages, and novel features of the invention will be more apparent from the following description when taken in connection with the accompanying drawing in which:

Fig. 1 is a block diagram schematically illustrating a preferred embodiment of the invention; and Fig. 2 is a schematic diagram more specifically illustrating one of the blocks of Fig. 1.

In accordance with the invention, the low speed and high speed error signals are combined continuously, in amplifiers, with the gain of the amplifier system controlled in accordance with the displacement error to give predominance to the high or low speed error signals for small or large errors respectively.

Referring now more particularly to Fig. 1, a load 10 is to be driven by a motor 12 to a position of correspondence with a control element. The control element is exemplified by the hand wheel 14. The hand wheel 14 is coupled directly through suitable gearing to the rotor of synchro transmitter 16 and also to the rotor of a synchro transmitter 18 through a step up gearing 19. It will be understood that the rotor of synchro transmitter 18 because of the gearing 19 is rotated through an angle of $n$ times, say 36 times, that of the rotor of transmitter 16. The synchro transmitters 16, 18 respectively, are electrically connected to distant synchro control transformers 20, 22. The rotors of synchro control transformers 20, 22 are connected respectively mechanically to the load 10, or the output of the motor 12. A gearing 24 steps up the rotation of the rotor of transformer 22 by the same ratio as the gearing 20 steps up the rotor of transmitter 18. The rotors of transformers 20, 22 are respectively electrically connected by connections 26 and 28 to amplifiers and control circuits 30. Connection 26 carries an error signal ($e_1$—the so-called low speed error signal) which is dependent upon the displacement between the load and its position of correspondence with the hand wheel 14 (the control element). Connection 28 carries a second high speed error signal $e_2$ which, like the signal $e_1$, has zero amplitude when the load 10 is in its position of correspondence with hand wheel 14. However, error signal $e_2$ has other zero amplitude error responses. The amplifiers and interconnecting circuits 30 which are to be more specifically described in connection with Fig. 2, assume the function of suitably amplifying and combining the error signals $e_1$ and $e_2$. When $e_1$ is near zero, $e_2$ is to be amplified and applied as the control signal or at least predominates as the control signal. As the error amplitude of the error signal $e_1$ increases, the gain of the amplifier of the low speed error signal $e_1$ is increased and the gain applied to the high speed error signal $e_2$ is decreased until control rests almost wholly with the low speed error signal $e_1$. The signals $e_1$, $e_2$, at the outputs of the amplifiers, however, are continuously combined rather than by any switching action in a discrete step or steps. Control is thus shifted from the low speed error signal $e_1$ to the high error speed signal $e_2$ or vice versa, depending on the error, without discontinuities. Violent actuation and extreme mechanical strains on the equipment may be thereby avoided. The control signal or combined or composite error signal as a function of error or displacement of the load from the position of correspondence may approach a flat top wave with a steep precision cross-over at the point of zero error.

The resultant control signal is applied to a control circuit 32 which may be any type of conventional control circuit suitable and which may include amplifying circuits. Control circuit 32 is electrically connected to the motor 12 to cause the motor to drive the load 10 toward positional correspondence with hand wheel 14.

Referring now more particularly to Fig. 2, exemplifying the amplifiers and interconnecting circuits 30 of Fig. 1, the connections 26, 28 carrying respectively the low and high speed signals $e_1$, $e_2$, may lead to the primaries 40 and 42, respectvely, of transformers 44 and 46. One terminal of a secondary 48 of transformer 44 is connected to the grid 50 of vacuum tube 52. Vacuum tube 52 is part of an amplifier stage 54. The other terminal of secondary 48 is connected to a rectifier 56 comprising a diode 58 and a resistor-capacitor combination 60. The rectifier 56 is connected to one terminal of another secondary 64 of transformer 44. The limiter 62 which in this instance is simply a gas tube preventing current of either polarity from exceeding a substantialy fixed amplitude, is connected across the secondary 64. The secondary 64 is grounded at its center tap. The other terminal of secondary 64 is also connected across the limiter 62, thence through a capacitor 73 to another rectifier 66 including a diode 67 biased by a supply at 71, and a resistor-capacitor combination 69. Rectifier 66 is connected through a network 100 to the grid 68 of vacuum tube 70 which is part of an amplifier stage 72. The grid 68 is supplied with the high speed error signal $e_2$ from the secondary 74 of transformer 46. There are also connected across transformer 74, two resistors 76, 78, the junction between which is connected to rectifier 66. Resistors 76 and 78 form a non-linear combination in a manner and for a purpose that appears hereinafter. The output from amplifiers 54 and 72 is taken across load resistors 80 and 82 respectively through blocking capacitors 84 and 86 respectively and through resistors 88 and 90 respectively. The resistors 88 and 90 are connected at a junction point 92 from which the control signal is taken across a resistor 94. Resistor 94 is small in value with respect to resistors 88 and 90. The three resistors 88, 90 and 94 form a summing or addition circuit in a manner well known to the art. Each of grids 50 and 68 is supplied with suitable bias voltage through grid resistors 96 and 98 respectively.

In operation, let it be assumed initially that the low speed error signal $e_1$ is of considerable amplitude and represents a displacement of the load from its position of correspondence of, say 10° or 15°. The low speed error signal $e_1$ is then properly supplied to amplifier 54 because the signal $e_1$ is comparatively large, and rectified bias from the rectifier 56 overcomes the bias from resistor 96. The limiter 62 prevents rectifiers 56 and 66 from supplying bias voltages which are too large for the respective amplifiers 74 and 72. It will be noted that rectifier 56 provides a gain control voltage which, being applied to the grid 50 of tube 52, tends to increase the gain of amplifier 54 with increasing amplitude of the low speed error signal $e_1$. In this respect, the grid 50 acts like a gain control element for amplifier 54. Similarly, grid 68 acts as a gain control element for amplifier 72 except that the rectifier 66 rectifies in a polarity to decrease the gain of amplifier 72 with increasing low speed error signal $e_1$. Bias at 71 prevents the rectifying circuit 66 from decreasing the gain of amplifier 72 when the amplitude of $e_1$ is below a specified level. Capacitor 73 is a blocking capacitor, inserted so that the D. C. bias at 71 is isolated from ground and the resistor 71A is inserted so that the A. C. signal is isolated from ground. Initially, it may be assumed that the error signal is sufficiently large so that the voltage rectified in rectifier 66 completely cuts off the amplifier 72. Accordingly, the low speed error signal $e_1$ is amplified by amplifier 54, as stated above, and the signal thus amplified is substantially the sole control signal output which is fed to the control circuit 32 of Fig. 1 which controls the output of the motor. Now suppose that as the load 10 of Fig. 1 approaches positional correspondence with hand wheel 14, the low speed error signal $e_1$ is reduced. Accordingly, the gain control voltage from rectifier 56 applied to grid 50 is decreased, that at rectifier 66 is also decreased. Being in opposite polarities these rectified voltages as they decrease simultaneously, cause one amplifier 54 to decrease in gain and the other amplifier 72 to increase in gain. The result is that amplification of the low speed error signal $e_1$ is now reduced and that of the high speed error signal $e_2$ is increased. The outputs of the two amplifiers are added across the resistor 94, the circuit comprising resistors 88, 90, and 94 constituting a well-known adding circuit.

Normally, it is desired that at some particular angular deviation, say 2.5°, of the load from its positional correspondence with the control element that the high speed error signal $e_2$ have complete control. Then by the time the low speed error signal $e_1$ has the amplitude associated with such angular deviations, the bias applied to amplifier 54 through resistor 96 may be assumed sufficient to cut off that amplifier, and that applied from rectifier 56 insufficient to increase the gain of amplifier 54 to an operative value. Similarly, as the positional correspondence is decreased, that is the displacement is increased, amplifier 72 may be cut off at a desired value, by the bias voltage applied from rectifier 66. The cutoff values may obviously be adjusted by suitably adjusting the bias of amplifiers 54 and 72, say, at resistors 96 and 98 respectively. In the transition period, when control may be taken over completely by one or the other of the error signals, there need be no sudden switch, or undesired jerking of the equipment. This is particularly true if the transition is arranged to occur over suitable spread of positions of the load. It will be understood that it is not necessary at any time to have either signal completely cut off, unless so desired.

The combination of signals produced as the control signal may be written as $e = k_1 + k_2 e_2$, where $k_1$, $k_2$, represent variable factors. For the low speed signal $e_1$ to have control when the displacement is large, the ratio of $k_2$ to $k_1$ must be small and vice versa for the high speed signal $e_2$ to have control. It is not essential that $k_1$ and $k_2$ both be variable, as in the example herein afforded, but either one alone could be held constant and the other varied by omitting a suitable one of the rectifier circuits. It is obvious that only their relative values are important for the purposes of the invention. The voltage limiter 62 is included so that the maximum gain control voltage may be suitably limited. This may be omitted.

It is found that the practice of the invention as thus far described improves the smoothness of transition between control of the low and high speed signals. However, to have the proper characteristics for very smooth transfer, larger tubes or special gain controls, or both may be required. A further improvement in smoothness of the control transition is effected by making non-linear the network 100. A preferred form is to choose the resistor 78 to be a non-linear impedance or resistor of the type commonly known as thyrite as made by General Electric Company of a silicon compound. This resistor has a characteristic that when a voltage $E$ is applied across it, the current $I$ is $I = kE^n$, where $n$ may have a value of 3 to 7 and $k$ is a constant. Accordingly, as $e_2$ increases from zero the resistance of resistor 78 and the output of the network 100 (secondary 74, and resistors 76 and 78) to grid 68 rises sharply and then slowly levels off with increasing values of $e_2$ from zero upward. The rectifier bias at 71 is preferably so chosen that the smoothing is accomplished by the network 100 when the load is near the position of correspondence but so that the rectified control signal biases off grid 68 for large deviations from correspondence. Thus with increasing positional error of the load, in effect, the ratio $k_1/k_2$ is first comparatively small. As the positional error increases $k_2$ increases more slowly. The total error signal characteristic is one which increases very rapidly for values near zero error, with a steep cross-over, and then tends to flatten out. This characteristic assists in giving the desired sharp cross-over and smooth transfer of control.

It will be noted that it is possible for the system to stabilize with equilibrium at a false position with the load 180° away from the desired position of correspondence. This false positioning may be avoided by making the ratio between the high and low speed error signal gearings an odd number, or by using other standard means of avoiding such positions as are known to the art, which do not require switching, e. g., the generation of blocking signals to block the high speed signal loop at the false position. The concern in the present invention is with the great accuracy afforded by the high speed signal without the use of discrete switching. It will be understood that various details could be changed without departing from the invention. For example, the triode tubes shown are illustrative. They are shown in order to more directly and clearly explain the invention without unnecessary circuit details. It may be desirable to use filters appropriately placed as is customary in servo systems, and also the usual feedback loops. However, such additional or optional features are not described and illustrated, because they are not a part of the invention, although they may be used in the same system with the invention.

It will be apparent that we have developed a new and novel servo-control circuit, in which low speed and high speed error signals are combined to provide a composite control signal. The composite control signal is combined continuously, with one or the other low or high speed signal predominating in the composite signal depending on the relative error. The result is accomplished by controlling the gain applied to each of two amplifiers for the high and low speed error signals respectively in accordance with the error. Further improvement may be had by the use of non-linear elements in combination with such gain control. It will be apparent that by the present invention, a system may be built which is of very high gain and great accuracy and without objectionable features.

What is claimed is:

1. A dual speed servo mechanism system for bringing an object into positional corespondence with a control element comprising means to derive a first error signal dependent on the displacement of said object from a position of correspondence with said element, means to derive a second high speed error signal of greater positional correspondence periodicity than said first signal, means to combine said signals continuously into a control signal comprising separate first and second amplifiers respectively for said first and second error signals, means to control the respective gains of the two amplifiers the one with respect to the other dependent upon the displacement of said object, said gain control means comprising two circuits each having a rectifying means distinct from said amplifiers and each connected to receive said first error signal and each having a gain control voltage due to rectification by said rectifying means responsive to said first error voltage, one said circuit being connected to apply its gain control voltage to said first amplifier to increase the gain thereof with increase of amplitude of said first error signal, the other said circuit being connected to apply its gain control voltage to said second amplifier to decrease the gain thereof with increase of amplitude of said first error signal, and means to combine continuously the outputs of said amplifiers to provide a control signal, and a motor electrically connected to receive said control signal and mechanically connected to said object and responsive to said control signal to drive said object toward positional correspondence with said control element.

2. The system claimed in claim 1, said means to derive said error signals comprising synchro control transformers.

3. The system claimed in claim 1, the outputs of said amplifiers being combined additively.

4. A dual speed servo mechanism system for bringing an object into a position of rotational correspondence with a rotatable element comprising a one-to-one ratio synchro transmitter mechanically coupled to said element, a step-up gear ratio, a second synchro transmitter coupled through said step-up gear ratio to said first element, a synchro control transformer mechanically coupled to said object and electrically coupled to said first transmitter, a second synchro control transformer mechanically coupled through a step-up gear ratio of the same ratio as said first step-up gear ratio to said load and electrically coupled to said second synchro transmitter, first and second amplifiers coupled respectively to receive first and second error signals from said first and second transformers, first and second rectifiers connected to receive said first error signal, said first rectifier being connected to a gain control element of said first amplifier to increase the gain thereof with increase of amplitude of said first error signal, said second rectifier being coupled to a gain element of said second amplifier to increase the gain thereof with decreased amplitude of said first error signal, means to additively combine the outputs of said amplifiers, a motor, and means to control the direction of rotation and torque of said motor in response to said additive signal to reduce said additive signal, said load being connected to be driven by said motor.

5. The system claimed in claim 4, further comprising a peak voltage limiter, said first and second rectifiers being connected to receive said first error signal through said limiter.

6. The system claimed in claim 4, the coupling of said second synchro control transformer to said second amplifier being through a non-linear network.

7. The system claimed in claim 4, the coupling of said second synchro control transformer to said second amplifier being through a further transformer having a secondary, and a non-linear resistor network connected across said further transformer secondary.

8. The system claimed in claim 7, at least one of the resistors of said resistor network being of the type known as thyrite.

9. A servo mechanism system for bringing an object into positional correspondence with a control element comprising means to derive a first error signal dependent on the displacement of said object from a position of correspondence with said element, means to derive a second high speed error signal having a positional correspondence periodicity an integral number of times that of said first error signal, means to combine said signals into a composite control signal comprising separate first and second amplifiers respectively connected to receive said first and second error signals, gain control means comprising first and second rectifiers connected to receive said first error signal, said first rectifier being connected to said first amplifier to increase the gain thereof with increase of amplitude of said first error signal, said second rectifier being connected to said second amplifier to increase the gain thereof with decrease of amplitude of said first error signal, and means to combine continuously by addition the outputs of said amplifiers, and a motor electrically connected to receive said composite control signal and mechanically connected to said object and responsive to said composite control signal to drive said object toward positional correspondence with said control element.

10. The system claimed in claim 9, further comprising a control circuit including amplifying circuits connected between said addition combining means and said motor.

11. The system claimed in claim 9, one of said amplifiers being connected to receive its respective error signal through a non-linear network.

ARTHUR F. NAYLOR.
ARNOLD M. SPIELBERG.

References Cited in the file of this patent
UNITED STATES PATENTS

| Number | Name | Date |
|---|---|---|
| 2,409,970 | Agins | Oct. 22, 1946 |
| 2,446,532 | Edwards | Aug. 10, 1948 |
| 2,511,863 | McCoy | June 20, 1950 |
| 2,560,337 | Fouassin | July 10, 1951 |
| 2,561,654 | Eller | July 24, 1951 |
| 2,614,237 | Goertz | Oct. 14, 1952 |
| 2,620,441 | McCoy et al. | Dec. 2, 1952 |

FOREIGN PATENTS

| Number | Country | Date |
|---|---|---|
| 373,253 | Italy | July 22, 1939 |